US011977590B1

(12) United States Patent
Pellow et al.

(10) Patent No.: US 11,977,590 B1
(45) Date of Patent: May 7, 2024

(54) VISUAL NAVIGATION INTERFACE FOR ITEM SEARCHING

(71) Applicant: Amazon Technologies, Inc., Seattle, WA (US)

(72) Inventors: Benjamin Pellow, Ashland, OR (US); Dnyanada Aniruddha Joshi, Seattle, WA (US); Yueyang Mi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/932,486

(22) Filed: Sep. 15, 2022

(51) Int. Cl.
*G06F 16/9532* (2019.01)
*G06F 16/954* (2019.01)

(52) U.S. Cl.
CPC ........ *G06F 16/9532* (2019.01); *G06F 16/954* (2019.01)

(58) Field of Classification Search
CPC ............................ G06F 16/9532; G06F 16/954
See application file for complete search history.

(56) References Cited

U.S. PATENT DOCUMENTS

| | | | | |
|---|---|---|---|---|
| 8,249,885 B2* | 8/2012 | Berkowitz | ......... | G06Q 30/0625 705/1.1 |
| 8,830,225 B1* | 9/2014 | Karakotsios | .......... | G06F 16/954 345/419 |
| 8,972,895 B2* | 3/2015 | Gonsalves | ......... | G06Q 30/0641 715/810 |
| 9,043,148 B2* | 5/2015 | Bourque | .......... | G08G 1/096827 701/532 |
| 9,076,172 B1* | 7/2015 | O'Twomney | ....... | G06F 3/04842 |
| 9,299,030 B1* | 3/2016 | Hotchkies | ........... | G06F 16/9574 |
| 9,305,090 B1* | 4/2016 | Hotchkies | ........... | G06F 16/3322 |
| 9,400,844 B2* | 7/2016 | Zohar | ................... | G06F 16/951 |
| 9,589,032 B1* | 3/2017 | Brinck | ............. | G06F 16/90324 |
| 9,785,678 B1* | 10/2017 | Peery | .................... | G06F 16/954 |
| 10,089,674 B1* | 10/2018 | Bhatia | ................ | G06Q 30/0627 |
| 10,445,683 B1* | 10/2019 | Hession | .............. | G06F 16/2228 |
| 10,706,450 B1* | 7/2020 | Tavernier | ............ | G06F 16/9535 |
| 11,100,554 B1* | 8/2021 | Gupta | ................. | G06F 16/9535 |
| 11,106,751 B1* | 8/2021 | Kadayam | .............. | G06F 16/954 |
| 11,138,285 B2* | 10/2021 | Zhang | ................. | G06F 16/9538 |
| 11,698,940 B1* | 7/2023 | Canfield | ............. | G06F 16/9574 707/722 |

(Continued)

*Primary Examiner* — Mark E Hershley
(74) *Attorney, Agent, or Firm* — Knobbe, Martens, Olson & Bear, LLP (57) ABSTRACT

Systems and methods are provided for presenting selectable page navigation options representing topics or search queries determined to be relevant to an item that a user is viewing on an initial page. When a user selects to begin entering a search query in a search filed on the initial page, a system may determine two or more page destinations to recommend to the user based on the first item presented on the initial page, where the page destinations may each represent a different topic or search query. These recommended destinations may then be presented over at least a portion of the initial page near the search field as selectable options for navigating to a corresponding recommended page destination. The selectable options may include, for each recommended page destination, an image representing the page destination and text identifying the page destination.

17 Claims, 8 Drawing Sheets

(56) References Cited

U.S. PATENT DOCUMENTS

| | | | |
|---|---|---|---|
| 11,748,759 B1* | 9/2023 | Sardari | G06N 20/00 |
| | | | 705/44 |
| 11,762,935 B2* | 9/2023 | Reed | G06F 16/9535 |
| | | | 705/14.23 |
| 2001/0049674 A1* | 12/2001 | Talib | G06Q 10/10 |
| 2011/0093488 A1* | 4/2011 | Amacker | H04L 67/02 |
| | | | 707/E17.014 |
| 2011/0137881 A1* | 6/2011 | Cheng | G06F 16/951 |
| | | | 707/706 |
| 2011/0283232 A1* | 11/2011 | Jordan | H04N 21/47 |
| | | | 715/810 |
| 2012/0130847 A1* | 5/2012 | Kalin | G06Q 30/0641 |
| | | | 705/26.7 |
| 2013/0018914 A1* | 1/2013 | Westphal | G06Q 30/0603 |
| | | | 707/769 |
| 2013/0030953 A1* | 1/2013 | Marsic | G06K 7/10297 |
| | | | 705/26.7 |
| 2013/0073389 A1* | 3/2013 | Heath | G06Q 30/02 |
| | | | 705/14.54 |
| 2013/0253940 A1* | 9/2013 | Zziwa | G16Z 99/00 |
| | | | 705/2 |
| 2014/0108445 A1* | 4/2014 | Oztekin | G06F 16/9535 |
| | | | 707/767 |
| 2014/0250176 A1* | 9/2014 | Sohn | G06Q 30/0631 |
| | | | 709/204 |
| 2014/0365853 A1* | 12/2014 | Kleinhout | G06F 16/285 |
| | | | 715/205 |
| 2015/0095847 A1* | 4/2015 | Kleinhout | G06F 3/0486 |
| | | | 715/838 |
| 2016/0063006 A1* | 3/2016 | Belogolov | G06F 16/3322 |
| | | | 707/767 |
| 2016/0259497 A1* | 9/2016 | Foss | G06F 3/04842 |
| 2016/0330150 A1* | 11/2016 | Joe | G06F 3/0486 |
| 2017/0364965 A1* | 12/2017 | Kannan | H04L 67/02 |
| 2018/0225375 A1* | 8/2018 | Collins | G06F 16/951 |
| 2019/0034976 A1* | 1/2019 | Hamedi | G06Q 30/0243 |
| 2020/0304863 A1* | 9/2020 | Domm | H04L 67/55 |
| 2020/0380029 A1* | 12/2020 | Chen | G06F 3/0237 |
| 2021/0012280 A1* | 1/2021 | Paquin | G06Q 10/0838 |
| 2021/0334879 A1* | 10/2021 | Sussman | G06Q 30/0282 |
| 2021/0406685 A1* | 12/2021 | Carmody | G06N 3/04 |
| 2022/0179526 A1* | 6/2022 | Schöberl | H04N 21/4668 |
| 2022/0179665 A1* | 6/2022 | Rathod | G06F 9/451 |
| 2022/0198779 A1* | 6/2022 | Saraee | G06V 10/40 |
| 2022/0245209 A1* | 8/2022 | Cho | G06F 16/9535 |
| 2022/0261492 A1* | 8/2022 | Gentilcore | G06F 16/9535 |
| 2023/0005051 A1* | 1/2023 | Vg | G06Q 30/0633 |

* cited by examiner

VISUAL NAVIGATION INTERFACE FOR ITEM SEARCHING

BACKGROUND

Users browsing an electronic repository to identify products or other items of interest are often presented with a search bar or search field on each page of a website or each user interface provided within an application. For example, when viewing a page that provides item details regarding a first item that the user has expressed interest in, the user may be able to enter a search string or search query within a text entry field that enables the user to search for different items or different content than the user's currently viewed item and/or page. Based on existing search approaches, the results of a user entering a search query when viewing a page about one item would typically be the same as the search results for the same search query if the user were to enter the query when viewing another item's page within the same website or service. On any given page from which the user would like to initiate a search, the user would typically need to formulate the search query that they are interested in and type it into a text field. The user would then typically select a button or other selectable option to initiate the search for the search string entered by the user, then would be presented with a search results page that may include items matching or relevant to the user's typed search string.

BRIEF DESCRIPTION OF DRAWINGS

Embodiments of various inventive features will now be described with reference to the following drawings. The drawings are provided to illustrate example embodiments described herein and are not intended to limit the scope of the disclosure.

DETAILED DESCRIPTION

Generally described, aspects of the present disclosure relate to presenting a visual navigation pane to a user who is viewing an item detail page that suggests destination pages related to the currently viewed item. These recommended destinations may represent suggested search queries, such as search queries that other users have searched or selected in a similar navigation pane when previously viewing the given item detail page. Alternatively, the page destinations may represent topics or categories of items related to the current item. The navigation pane with selectable options may be shown dynamically over a portion of the item detail page when a user clicks on or otherwise selects a search field within the item detail page. For example, when a user selects to begin entering a search query in a search field on the initial item detail page, a server may determine two or more page destinations to recommend to the user based on the item presented on the initial page, where the page destinations may each represent a different topic or search query. Selectable options to view these recommended page destinations may then be presented over at least a portion of the initial page near the search field as selectable options for navigating to a corresponding recommended page destination. The selectable options may include, for each recommended page destination, an image representing the page destination, such as an image of a representative item for a given topic or search query, and text identifying the topic or query.

Based on approaches described herein, a user may not need to formulate his or her own search query after clicking in, tapping, or otherwise selecting to enter text in a search field, but may instead select from automatically populated options within a visual navigation interface. These automatically populated options may be selected and sorted based on relevance to the particular item that the user is already viewing on the current page. By recommending search queries, topics or other destination pages that are related to the current item or commonly visited or searched from the current page by other users, the system may help users to formulate queries, learn new topics, and access relevant items in less time and without intermediate pages being loaded to the user's device relative to alternative search approaches.

In some embodiments, an item as referenced herein may generally refer to a product and/or service available for browse and/or purchase by a user, such as may be listed in an electronic catalog or by a retail service. In other embodiments outside of the retail context, an item could refer to an article, movie, or other content to be read or otherwise consumed without necessarily being a product or necessarily available for purchase. An item data store may store item information regarding a number of items, such as items available for browse and/or purchase via a retail service or listed in an electronic catalog. Item data stored in the item data store may include any information related to each item, which may vary based on the type of item and particular embodiment. For example, item data may include, but is not limited to, price, availability, title, item identifier, item feedback (e.g., user reviews, ratings, etc.), item image, item description, item attributes (which may vary depending on the type of item, such as page count of a book item, size for a clothing item, console type for a video game item, etc.), item category, keywords associated with the item, etc.

Figure 1A:
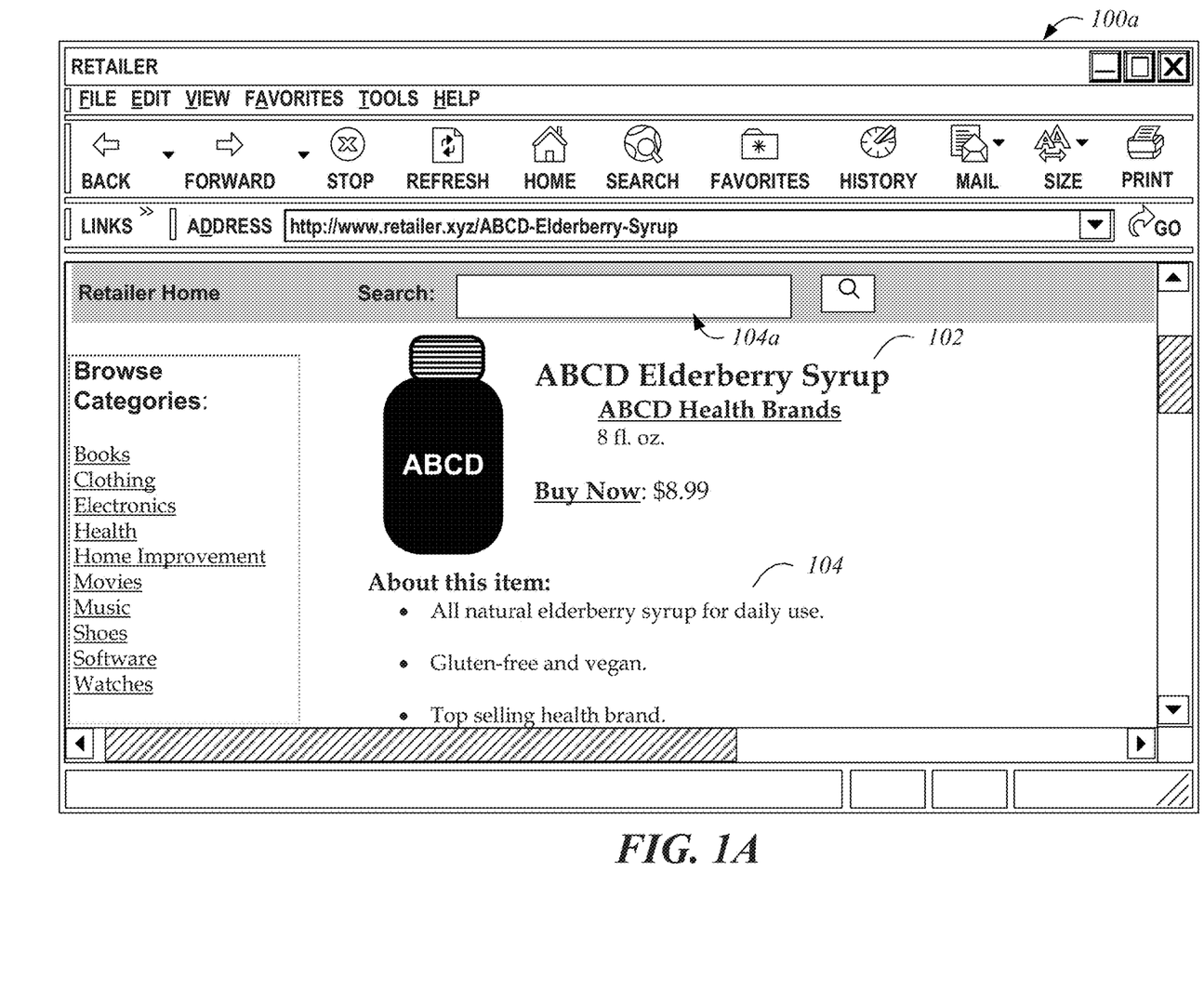
FIG. 1A depicts an illustrative item detail user interface that presents information regarding an item to a user, and includes a search field for the user to enter a search query to search for other items.

FIG. 1A depicts an illustrative item detail user interface 100a that presents information regarding an item 102 to a user, and includes a search field 104a for the user to enter a search query to search for other items. The user interface 100a may be presented by a user device, such as a desktop computer, laptop computer, mobile device (such as a mobile phone or tablet device) or other personal computing device. As shown, the user interface 100a is presented as a webpage by a browser application operating on a user's computing device. In other embodiments, a dedicated software application distributed by a retail service or other operator of the service that provides item searching and browsing functionality may present a user interface similar to user interface 100a rather than a browser. Accordingly, references herein to a page are not limited to a webpage and are instead intended to broadly refer to a set of content presented together within a user interface of a browser or other software application. In some embodiments, portions of the user interface 100a may be generated by a server or other remote system and sent over a network to the user's computing device for display.

As shown, user interface 100a presents information 104 and an image regarding item 102, "ABCD Elderberry Syrup," which is available for purchase via a retail service. The user viewing the user interface 100a may have navigated to user interface 100a (which may be considered an item detail page for item 102) as a result of selecting a hyperlink or other selectable option for the item 102 from within a previously presented page, such as a search results page, an item detail page for a previously viewed item, an item category page listing popular items in a product category of interest to the user, and/or in another manner. Suppose that the user decides, after viewing the item information 104 for item 102, that item 102 is no longer of interest to the user or is not quite what the user was looking for—the user may in turn decide to enter a new search term to search for different items by clicking in (e.g., moving a cursor to, and clicking a mouse button), tapping (on a touchscreen device) or otherwise selecting the search field 104a. Search field 104a may be configured to enable the user to enter text and select a search button or otherwise indicate to the computing device that the user would like the user's typed search query submitted (e.g., by pressing an enter key on a keyboard) in order to request that a system (such as a server associated with an electronic catalog service or retailer) search for other items matching the entered search query or string.

Figure 1B:
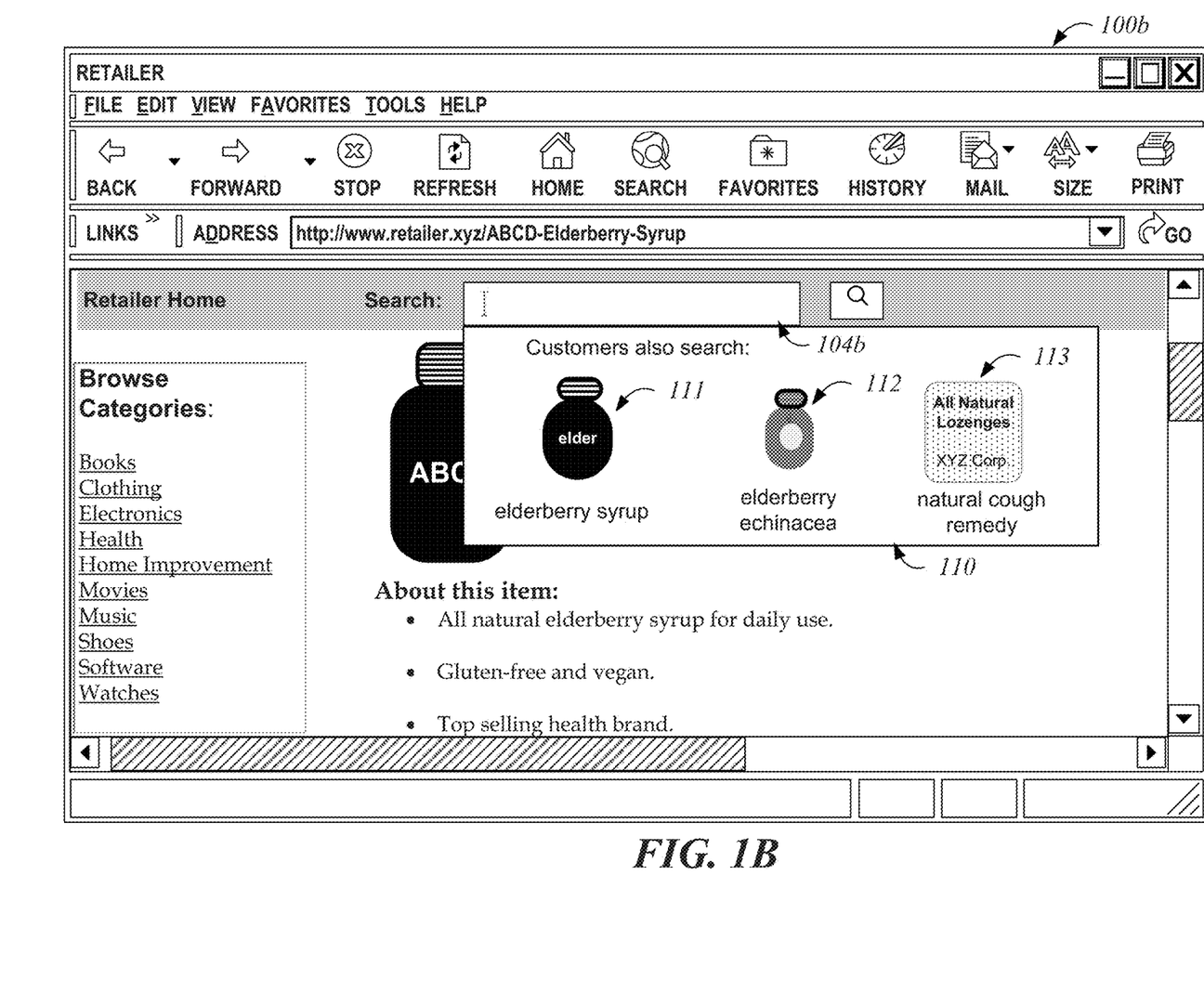
FIG. 1B depicts an updated view of the user interface of FIG. 1A after a user has selected the search field in order to begin typing a search query, where the updated view includes a visual navigation pane with selectable options of recommended search queries.

FIG. 1B depicts user interface 100b, which may be an updated view of the user interface of FIG. 1A after a user has selected the search field 104a in order to begin typing a search query. The updated user interface 100b includes a visual navigation pane 110 with selectable options of recommended search queries. The navigation pane 110 may have appeared over a portion of the user interface (in this case, at a location immediately beneath the search field 104b, though the pane may appear in other locations near to or adjacent to the search field in other embodiments) in response to the user clicking or otherwise selecting to begin typing within search field 104b. While the user may continue to type any search query that the user would like within the search field 104b (such as using a keyboard), the visual navigation pane 110 provides a quicker and easier option for the user to reach a potentially desired destination page without necessarily typing anything within search field 104b.

The visual navigation pane 110 indicates (via the text "Customers also search:") that selectable options 111, 112 and 113 each represent topics or queries that other users have searched for after viewing item 102 or when searching from within a search field presented on an item detail page for item 102 (such as a user interface similar to user interface 100b presented to other users in the past). Methods that may be implemented by a computing system to identify the recommended topics, queries or other potential destinations to display within visual navigation pane 110 will be further discussed below with reference to FIGS. 2 and 4. In the illustrated embodiment, the selectable options 111, 112 and 113 may each represent either (a) a different search query (in this case, "elderberry syrup," "elderberry echinacea," and "natural cough remedy") that one or more other users have searched from a search field within an item detail page for item 102, or (b) a different topic determined to be particularly relevant to item 102.

Each of the selectable options 111, 112 and 113 includes an image, which may be an image of a representative item associated with the corresponding recommended query or topic. For example, the image shown in association with the selectable option "elderberry syrup" 111 is shown as a photograph of a particular elderberry syrup product that ranks highly (such as being the top result) in search results for the recommended search term "elderberry syrup." In some embodiments, either the image or text (e.g., either the bottle image or corresponding text "elderberry echinacea" in option 112) may be clicked, tapped or otherwise selected by the user in order to navigate a browser or other application to a new page regarding the query or topic of option 112, which may be similar to that described with respect to FIG. 1C below.

Figure 1C:
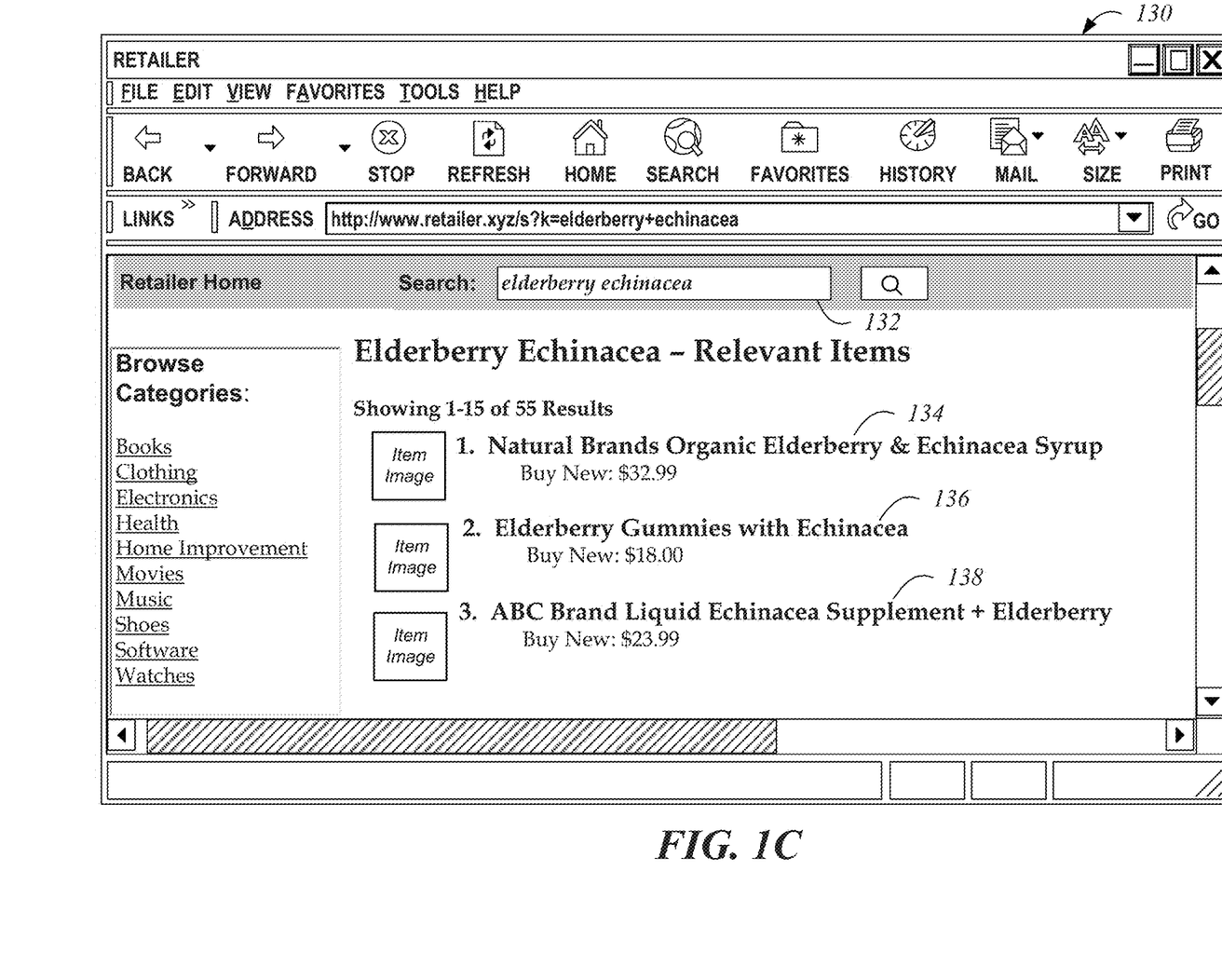
FIG. 1C depicts an illustrative destination page, in this case a search results page, presented to a user in response to the user's selection of a selectable option from the visual navigation pane of FIG. 1B.

FIG. 1C depicts an illustrative destination page 130, in this case a search results page, presented to a user in response to the user's selection of a selectable option from the visual navigation pane 110 of FIG. 1B. The user interface 130 may be presented in response to the user selecting selectable option 112 (e.g., selecting either the bottle image or corresponding text "elderberry echinacea" in option 112 of FIG. 1B). As shown, the search field 132 has been automatically populated with the selected search query "elderberry echinacea," without the user needing to formulate that query on his or her own and without requiring that the user type a search string in the previously presented user interface 100b. The search results page in this case presents the top items matching the search string "elderberry echinacea," which includes items 134, 136 and 138. The user may then select one of the search result's items to view a corresponding item detail page for the selected item.

In other embodiments, a search results page similar to user interface 130 that is presented after a user selects to navigate to a topic destination page may present items in a different manner, such as including multiple rows that each include two or more items associated with sub-topics or categories of items, and which may be navigated in a "carousel" manner at the row level to scroll items horizontally within a row. For example, if the selected topic were "camping gear," a row may be presented for "tents" (such as listing a number of different camping tent items) and another row presented for "sleeping bags" (such as listing a number of different sleeping bag items).

Figure 2:
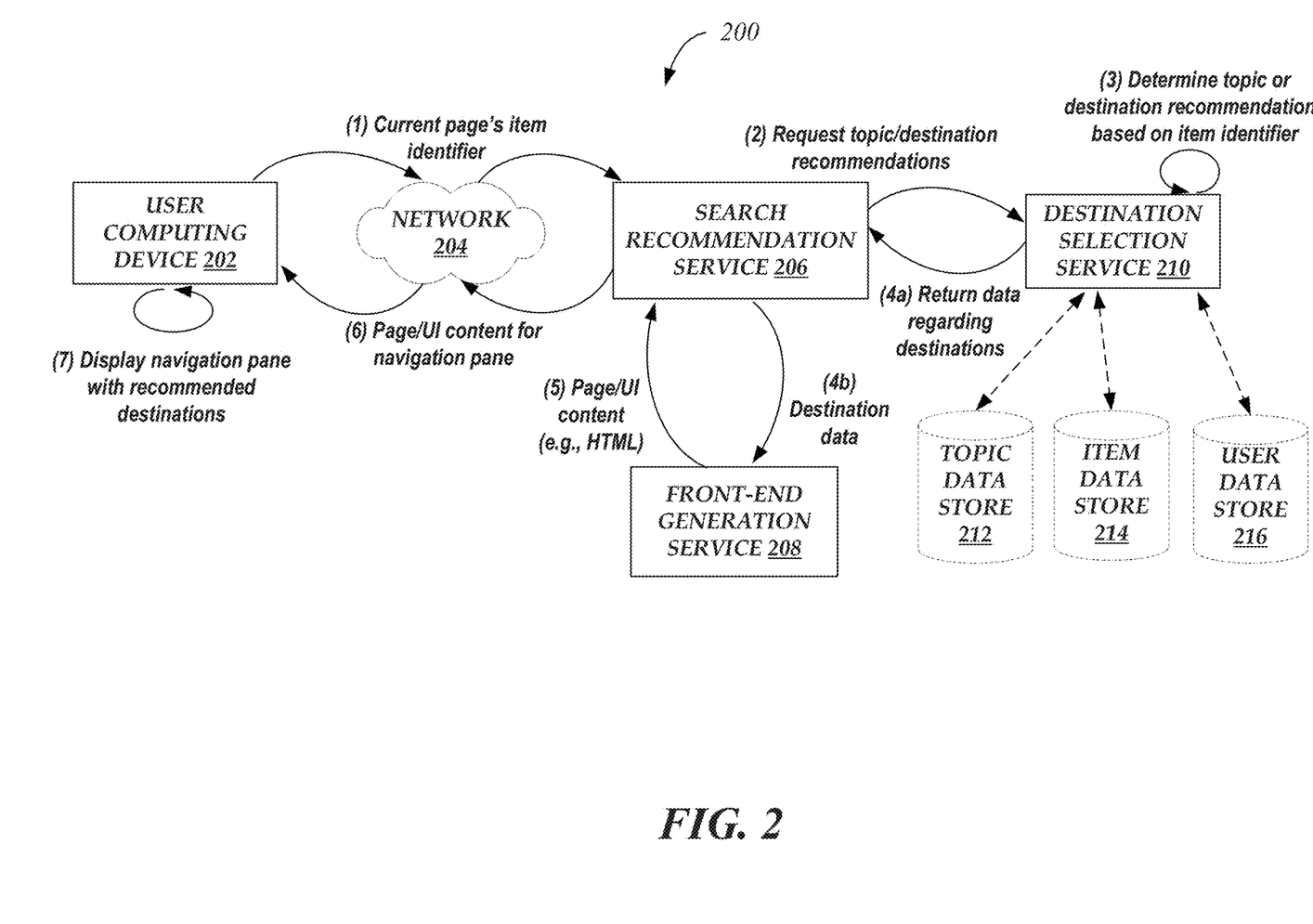
FIG. 2 is a block diagram and illustrative flow of data within an example operating environment for implementing aspects of the present disclosure, according to some embodiments.

FIG. 2 is a block diagram and illustrative flow of data within an example operating environment 200 for implementing aspects of the present disclosure, according to some embodiments. As shown, a user computing device 202, at step (1), may send a current page's item identifier over a network (such as the Internet) to a search recommendation service 206, which may include or be executed by one or more servers or other computing systems. The item identifier may be sent either at the time that a user selects a search field on an item detail page (as discussed in the example of FIGS. 1A and 1B above), or in connection with an initial page load for an item detail page in order to pre-fetch topic or search recommendations that will be presented later on in the case that a user later selects a search field. In some embodiments, the item identifier may be an alphanumeric string or number that uniquely identifies an item identified in a data store, such as a particular product listed in an electronic catalog. As discussed above, the type of item may vary between embodiments, and is not limited to a product or to an item available for sale.

In some embodiments, additional information regarding the page, user, and/or current session may be sent at step (1) to the recommendation service 206. For example, the network communication to the search recommendation service 206 may further include an indication of a particular item attribute selection made by the user on the current page (such as selecting a particular size or color of a garment item), a full URL of the current page being viewed on the user computing device, a user identifier, a session identifier, a marketplace identifier, a locale or geographic location/region (e.g., U.S., English), display type for subsequent search or topic recommendations (e.g., a code indicating a navigation pane at the top of a browser window), and/or optional additional page context information (such as prior intra-page selections or other data regarding the user's interaction with the item detail page and/or user actions prior to viewing the item detail page).

Next, at step (2) of FIG. 2, the search recommendation service 206 may send a request to a destination selection service 210 for topic or other page destination recommendations. The search recommendation service 206 may be local or remote to the destination selection service 210, and each may be operated by the same entity in some embodiments. The request at step (2) may include the item identifier received from the user computing device 202 (e.g., the identifier for the item currently being viewed by the user computing device). This request may also include any of the additional information that may have been received from the user computing device as discussed above with respect to step (1).

At step (3), the destination selection service 210 may determine two or more topic or other destination recommendations for the user based at least in part on the item identifier of the currently viewed item. As discussed above, the destination recommendations may each represent different topics in some embodiments, different item categories in other embodiments, or different search queries in other embodiments, among other options. In some embodiments, the destination selection service 210 may determine the recommended destinations based on data from a topic data store 212, item data store 214, and/or user data store 216. In some embodiments, multiple items from a user's browsing history may be considered in combination by the destination selection service 210 when determining topic or search recommendations. In other embodiments, the destination selection service 210 may consider past actions of the user other than viewed items when determining topic or search recommendations, such as considering a user's viewed item(s) in combination with one or more search queries previously submitted by the user.

The topic data store 212 may store information identifying a number of different topics that are each associated in advance with a number of different items (such as using methods described further below with respect to FIG. 4) that have their information stored in item data store 214. A user data store 216 may include user behavior data associated with a number of users of a retail service or other service used to browse and/or purchase items. In some embodiments, the data in user data store 216 may be anonymized but provide indications of browse session data such as which items users viewed and/or purchased after submitting various search queries or after viewing other particular items. As will be further described below, the topics or search queries to recommend may be determined at step (3) based on the destination selection service 210 generating scores for various topics or queries stored in topic data store 212 and/or user data store 216, where the scores for each topic or query represent their respective relevance to the item identified by the item identifier that was provided to the destination selection service 210 at step (2). The destination selection service may further select a representative image for each recommended destination, which may be an image of a representative item associated with the respective destination (e.g., a highest-ranking item for a given search query or topic represented by the given destination).

Techniques for grouping items related to a similar topic or entity (such as a certain labeled concept, person, place, thing, and/or subject matter) that may be employed to populate data in topic data store 212 in some embodiments of the present disclosure are described in co-owned U.S. Pat. No. 9,135,329, entitled "PRESENTING ITEM INFORMATION BASED ON ASSOCIATED ENTITY RELATIONSHIPS." As described in U.S. Pat. No. 9,135,329 ("the '329 Patent"), a graph may be generated and stored that associates items with particular topics or entities, and related topics or entities may also be linked to one another. The '329 Patent provides an example that a particular book item of "Alice's Adventures in Wonderland" may be associated in a graph structure with the story entity "Alice's Adventures in Wonderland" (which may be considered a topic as used herein), which in turn may be associated with a movie item "Alice in Wonderland" and costume items related to characters from the story (e.g., a Cheshire Cat costume and Mad Hatter costume), as a few examples. Accordingly, traversing an item-entity relationship graph is one example of a manner in which relationships and their associated strengths between items and topics may be determined.

In some embodiments in which the recommended page destinations determined at step (3) are search queries, the destination selection service 210 may employ reverse-search approaches to identify search queries strongly associated with the given input item, such as search queries in which the item appears as a high ranked search result and/or in which the item is frequently selected by users from search results pages for the given query. In scoring a given search query's relevance to the input item, the destination selection service 210 may consider the past performance of the search query when it has been previously presented as a recommended destination to past viewers of the input item's item detail page (e.g., how many times or what percentage of the time previous users selected the given search query from within a recommended destinations pane on the given item's item detail page).

At step (4a), the destination selection service 210 may return data regarding the determined recommended topics, queries or other page destinations to the search recommendation service 206. In some embodiments, the response sent at step (4a) may include, for example, a template identifier (such as an identifier for a template for the appearance of a navigation pane in which the recommendations will be presented), header text for display in the pane (e.g., "Customers also search:"), and topic or destination information regarding each topic or destination. The information regarding each topic or destination returned may include an image or image URL (uniform resource locator, which may be a form of uniform resource identifier), a link URL that will lead to the given destination page or interface, and a text descriptor or identifier to be displayed for the topic or destination.

The recommended destination data may be passed on at step (4b) to a front-end generation service 208 responsible for generating data that can be returned to the user computing device in a format suitable for interpretation, execution or other processing by a browser or other application of the user computing device in order to cause display of the desired user interface or page data. For example, an HTML template may be employed by the front-end generation service 208 to format page data or other user interface content that incorporates the recommended destination data, such as by placeholders in the template for a first, second and third topic being replaced with the associated recommended topics provided at step 4(b). This formatted page or user interface data may then be provided back to the search recommendation service at step (5), and subsequently returned over the network 204 to the user computing device 202 at step (6). The user computing device 202 may then display the navigation pane or other formatted user interface data with the recommended destinations at step (7). The resulting display may be formatted, for example, similar to FIG. 1B discussed above.

Figure 3A:
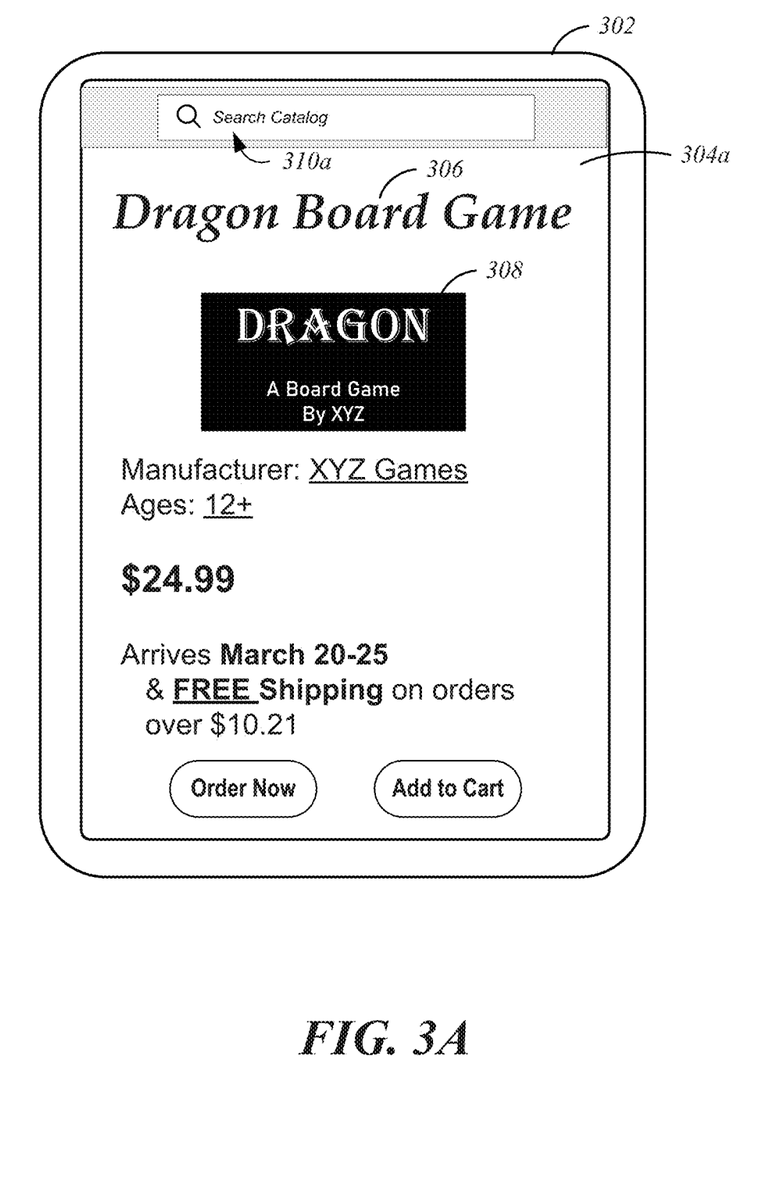
FIG. 3A depicts an illustrative item detail user interface, displayed on a mobile device, that presents information regarding an item to a user, and includes a search field for the user to enter a search query to search for other items.

FIG. 3A depicts an illustrative item detail user interface 304a, displayed on a mobile device 302, that presents information regarding an item 306 to a user, and includes a search field 310a for the user to enter a search query to search for other items. Mobile device 302 may be, in some embodiments, a smartphone or tablet computing device. User interface 304a, in some embodiments, may be considered a page, but may be presented by an application dedicated to a particular shopping service or item browsing service (as opposed to a general purpose browser application, which may be employed in other embodiments to view page content described herein).

As shown, item detail page 304a presents information regarding an item 306, identified as a particular board game named "Dragon Board Game" distributed by a company named XYZ Games. The item detail page 304a also includes an image 308 of the item 306. The user may view various displayed information regarding the item and select to purchase the item 306 from within the user interface 304a. However, if the user instead would like to search for a different item, the user may select search field 310a. Before the user begins typing in the search field 310a, the user interface 304a may be updated in response to the user's selection to begin typing to appear as user interface 304b of FIG. 3B.

Figure 3B:
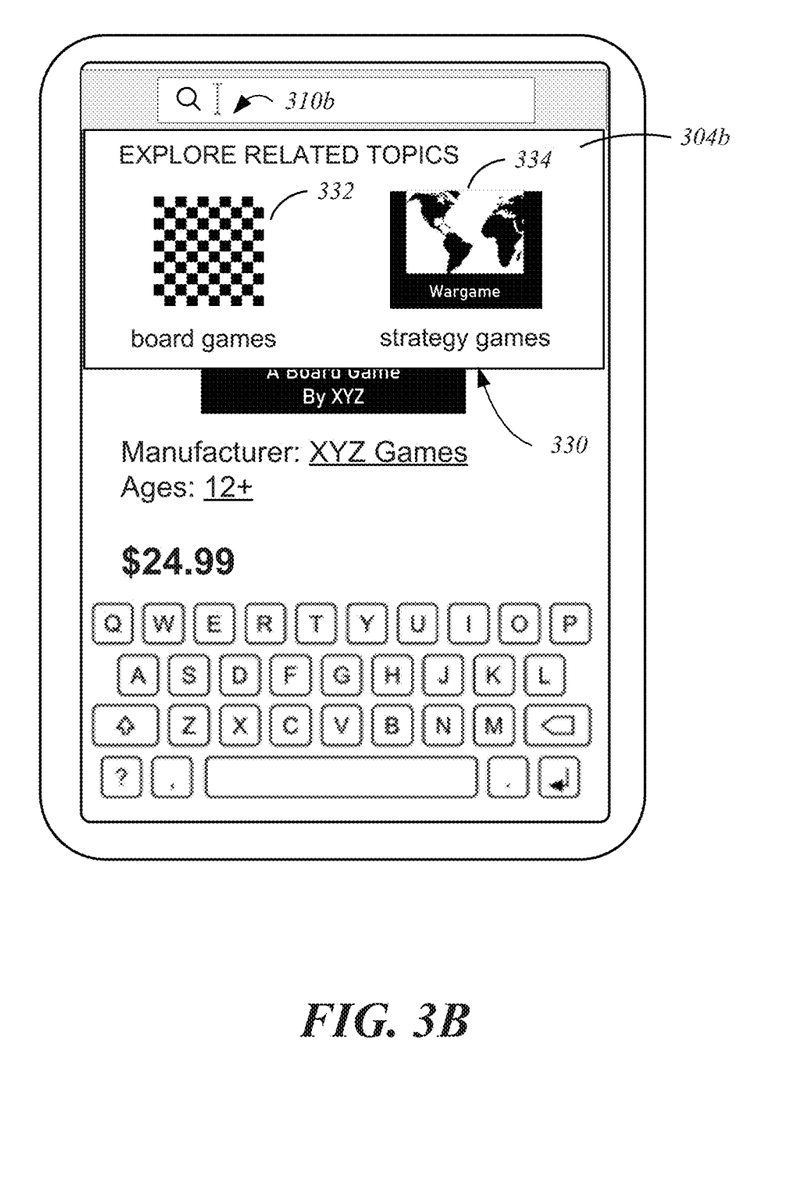
FIG. 3B depicts an updated view of the user interface of FIG. 3A after a user has selected the search field in order to begin typing a search query, where the updated view includes a visual navigation pane with selectable options of recommended topics related to the item shown on the page.

FIG. 3B depicts an updated view of the user interface of FIG. 3A after a user has selected the search field 310a (persisted as 310b, with the addition of a text insertion cursor, in updated user interface 304b) in order to begin typing a search query. The updated view includes a visual navigation pane 330 with selectable options of recommended topics 332 and 334 related to the item 306 shown in FIG. 3A. The recommended topics, "board games" topic 332 and "strategy games" topic 334, may each be topics that have been determined using methods described herein to be related to the particular board game ("Dragon Board Game") item that the user is currently viewing information about. For example, the system may have determined that users who view the item 306 often subsequently visit a topics page for the "board games" topic, view items associated with the "board games" topic, and/or that previous users have search for "board games" or similar topics from within a search field on an item detail page for item 306. As previously described with respect to user interfaces of FIGS. 1B and 1C, user selection of one of selectable options 332 or 334 (such as by selecting either the image or corresponding text representing the respective topic in the visual navigation pane 330) may cause display of a new page listing items associated with the selected topic.

Figure 4:
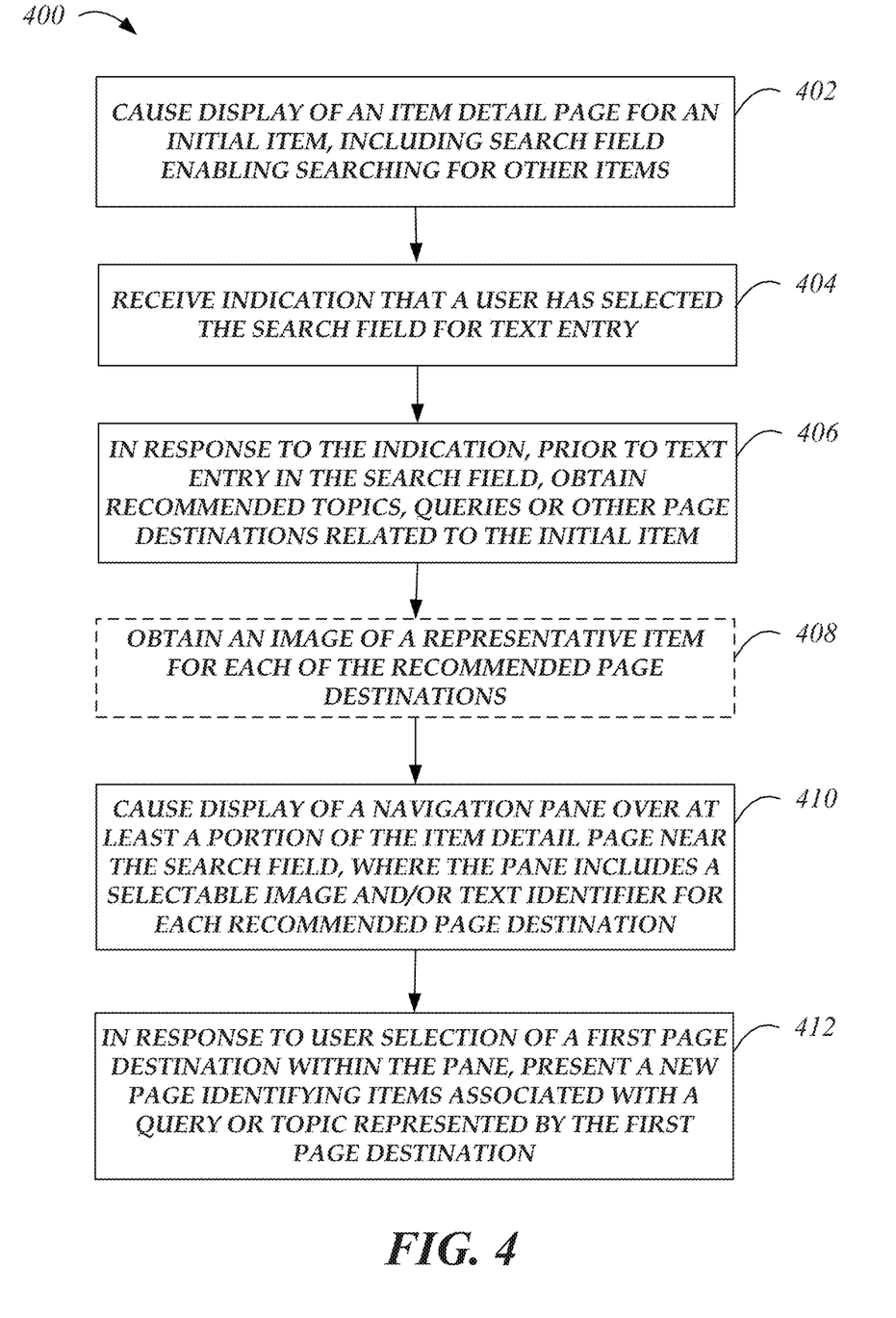
FIG. 4 is a flow diagram of an illustrative method for presenting a navigation pane identifying selectable recommended destination pages in response to user selection of a search field on an item detail page, according to some embodiments.

FIG. 4 is a flow diagram of an illustrative method 400 for presenting a navigation pane identifying selectable recommended destination pages in response to user selection of a search field on an item detail page, according to some embodiments. Depending on the embodiment, the method 400 may be implemented by a user computing device or by a server remote from the user computing device that ultimately displays the user interface (such as by a search recommendation service described above). In other embodiments, aspects of the method 400 may be performed by a user computing device (such as receiving indications of user input and causing a display of user interface data), while backend determinations of recommendations and their formatting for presentation to the user may be made by a server or other remote system that is in communication with the user computing device.

As an example embodiment, the method will be described below with reference to a user computing device performing the blocks of FIG. 4 (which may occur based in part on execution of code or interpretation of markup content received from a server providing a search recommendation service), though that is not intended to be limiting with respect to which system implements method 400. For example, in an alternate embodiment, a search recommendation service may receive indications of user selections over a network from a user computing device and may cause display of content by sending such content to a user computing device configured to interpret and display such content. The functionality referenced in each of the blocks shown in FIG. 4 has generally been previously described with respect to other figures above, and will thus only be briefly summarized below in some instances.

At block 402, the user computing device may cause display of an item detail page for an initial item, including a search field enabling a user to enter a search query as text input in order to search for other items. Example item detail pages have been described above, such as with reference to FIGS. 1A and 3A. While the user computing device displays the item detail page, the user computing device may receive an indication that a user has selected the search field for text entry, at block 404. As previously described above, the selection may occur via a mouse click, touch gesture, and/or other known input mechanism (e.g., keyboard shortcut, stylus, etc.) for users to make selections within a user interface. This selection may, as is known in the art, cause a browser or other application operating on the user computing device to insert a text insertion cursor within the search field such that any keys then typed by the user on a physical or virtual keyboard (e.g., an onscreen keyboard displayed by a mobile operating system that responds to touch input) will populate the search field with a string that the user intends to be interpreted as a search query.

At block 406, the user computing device may, in response to the indication that the user has clicked or tapped within the search field to begin typing a search query, obtain recommended topics, queries or other page destinations related to the initial item. In some instances, this may occur prior to the user necessarily entering any text in the search field. As previously discussed above with respect to FIG. 2, the user computing device may send a network request for the recommendation content to an external computing system or server, such as a search recommendation service or destination selection service. This request may include at least an item identifier of the currently viewed item (from the currently displayed item detail page). The request may optionally include other information regarding the user's prior actions and/or the currently viewed page, as previously described above. The remote system (such as a search recommendation service or destination selection service) may return the recommended search queries, topics or other page destinations to recommend.

As discussed above, the returned data in some embodiments may include HTML content that indicates display formatting for a navigation pane. In other embodiments, HTML or other markup or code content (such as in a template form with placeholders to be populated with recommended destinations) may have been previously stored by the user computing device, such as in association with the initial loading of the item detail page. It will also be appreciated that in the case of a pre-fetching of recommendation content at the time of the initial item detail page load, prior to the user selecting the search field, the recommendation content obtained at block 406 may be from a local cache of the user computing device.

At block 408, the user computing device may optionally obtain an image of a representative item for each of the recommended page destinations. In some embodiments, the image may be returned from the search recommendation service or destination selection service as part of the recommendation content returned at block 406. In other embodiments, the data returned by the search recommendation service or destination selection service at block 406 may include a URL for each representative item image, in which case the user computing device may at step 408 obtain the image files representing each topic or query from the respective URLs via network requests.

At block 410, the user computing device may cause display of a navigation pane over at least a portion of the item detail page near the search field, where the pane includes a selectable image and/or text identifier for each recommended page destination. Examples and further details with respect to block 410 have been described above, such as with reference to the user interfaces shown in FIGS. 1B and 3B.

Lastly, at block 412, the user computing device may, in response to user selection of a first page destination within the newly displayed navigation pane, present a new page identifying items associated with a query or topic represented by the user-selected first page destination. Accordingly, the user may view a search results page or topic page listing relevant items that the user is likely interested in without the user needing to actually formulate or type his or her own query. An example page that may be displayed at block 412, in one embodiment, has been described above with reference to FIG. 1C, with other alternative destination page formats also described above.

Figure 5:
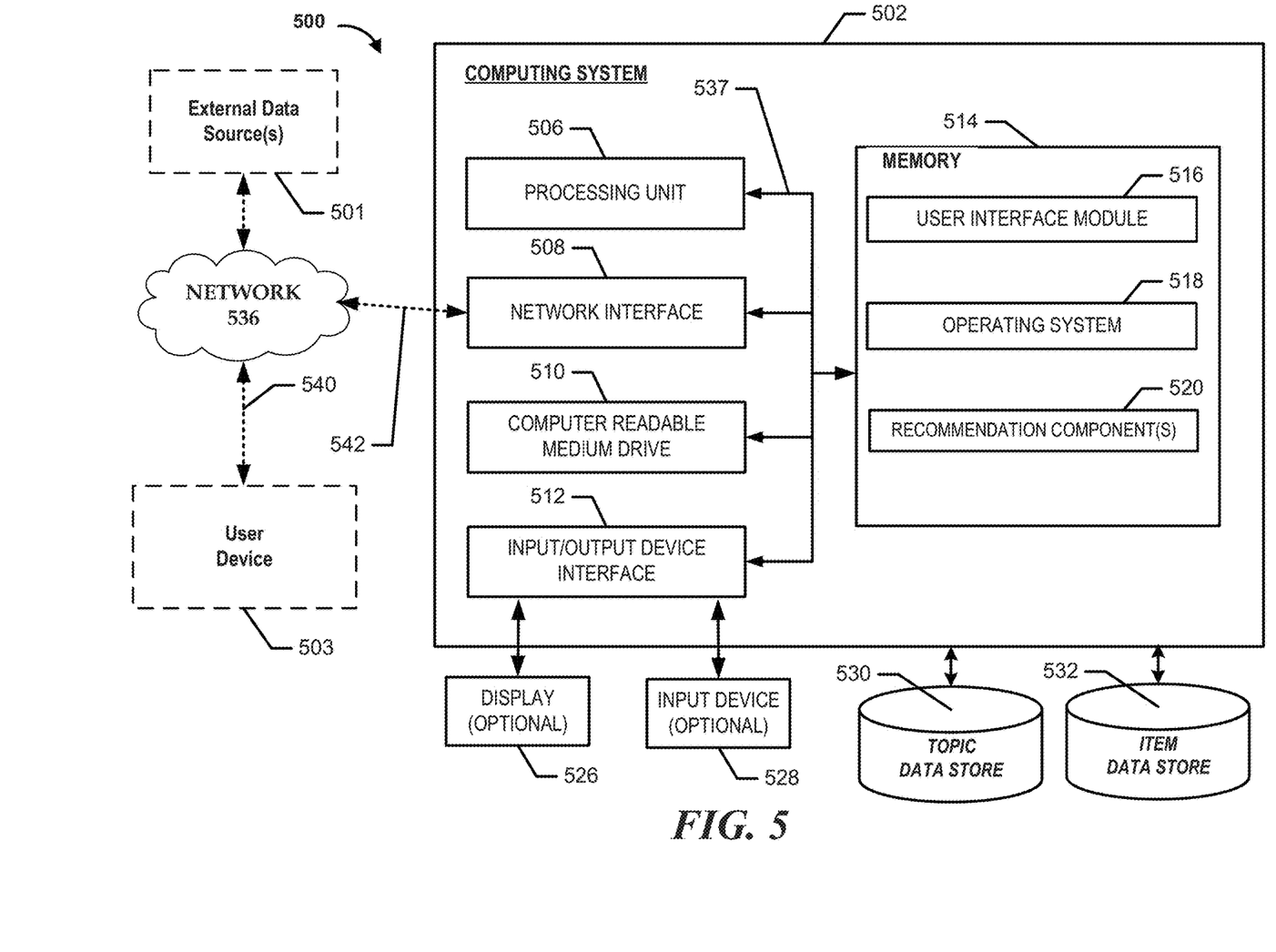
FIG. 5 is a block diagram depicting an illustrative architecture for a computing system that may implement one or more of the features described herein.

FIG. 5 illustrates a general architecture of a computing environment 500, according to some embodiments. As depicted in FIG. 5, the computing environment 500 may include a computing system 502. The general architecture of the computing system 502 may include an arrangement of computer hardware and software components used to implement aspects of the present disclosure. The computing system 502 may include many more (or fewer) elements than those shown in FIG. 5.

As illustrated, the computing system 502 includes a processing unit 506, a network interface 508, a computer readable medium drive 510, an input/output device interface 512, an optional display 526, and an optional input device 528, all of which may communicate with one another by way of a communication bus 537. The processing unit 506 may communicate to and from memory 514 and may provide output information for the optional display 526 via the input/output device interface 512. The input/output device interface 512 may also accept input from the optional input device 528, such as a keyboard, mouse, digital pen, microphone, touch screen, gesture recognition system, voice recognition system, or other input device known in the art.

The memory 514 may contain computer program instructions (grouped as modules or components in some embodiments) that the processing unit 506 may execute in order to implement one or more embodiments described herein. The memory 514 may generally include RAM, ROM and/or other persistent, auxiliary or non-transitory computer-readable media. The memory 514 may store an operating system 518 that provides computer program instructions for use by the processing unit 506 in the general administration and operation of the computing system 502. The memory 514 may further include computer program instructions and other information for implementing aspects of the present disclosure. For example, in one embodiment, the memory 514 may include a user interface module 516 that generates user interfaces (and/or instructions therefor) for display upon a computing system, e.g., via a navigation interface such as a browser or application installed on a user device 503.

In some embodiments, the memory 514 may include one or more recommendation component(s) 520, which may be executed by the processing unit 506 to perform operations according to various embodiments described herein, such as determining recommended topics or search queries related to an item. The recommendation component(s) 520 may access the topic data store 530 and/or item data store 532 in order to retrieve data described above and/or store data. The data stores 530 and/or 532 may each be part of the computing system 502, remote from the computing system 502, and/or may be a network-based service.

In some embodiments, the network interface 508 may provide connectivity to one or more networks or computing systems, and the processing unit 506 may receive information and instructions from other computing systems or services via one or more networks. In the example illustrated in FIG. 5, the network interface 508 may be in communication with a user device 503 via the network 536, such as the Internet. In particular, the computing system 502 may establish a communication link 542 with a network 536 (e.g., using known protocols) in order to send communications to the computing device 503 over the network 536. Similarly, the computing device 503 may send communications to the computing system 502 over the network 536 via a wired or wireless communication link 540. In some embodiments, the computing system 502 may additionally communicate via the network 536 with an optional external data source 501, which may be used by the computing system 502 to retrieve additional item data, electronic catalog data, item images, and/or other data.

Those skilled in the art will recognize that the computing system 502 and user device 503 may be any of a number of computing systems or devices including, but not limited to, a laptop, a personal computer, a personal digital assistant (PDA), a hybrid PDA/mobile phone, a mobile phone, a smartphone, a wearable computing device, a digital media player, a tablet computer, a gaming console or controller, a kiosk, an augmented reality device, another wireless device, a set-top or other television box, one or more servers, and the like. The user device 503 may include similar hardware to that illustrated as being included in computing system 502, such as a display, processing unit, network interface, memory, operating system, etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   memory; and
   at least one computing device configured with computer-executable instructions that, when executed, cause the at least one computing device to:
   send to a user computing device, for display by a browser or application operating on the user computing device, an item detail page for a first item listed in an electronic catalog, wherein the item detail page for the first item comprises (a) item information regarding the first item and (b) a search field that enables a user to type a search query in order to search for items listed in the electronic catalog that are related to the search query;
   receive an indication, prior to receiving text entry within the search field, that the user has selected the search field, wherein selecting the search field comprises at least one of a touch gesture within the search field or a mouse click while a cursor is within the search field;
   in response to the indication that the user has selected the search field, prior to receiving text entry within the search field, determine a plurality of page destinations to recommend to the user based on the first item presented on the item detail page, wherein the plurality of page destinations are each associated with at least one of a search query, a topic, or an item category;
   identify, for each individual page destination of the plurality of page destinations to recommend to the user, a representative item associated with the individual page destination;
   prior to receiving text entry within the search field, send data or instructions to the user computing device that, when processed by the browser or application, cause the browser or application to present a selectable navigation pane over at least a portion of the item detail page adjacent to or beneath the search field, wherein the selectable navigation pane includes, for each individual page destination of the plurality of page destinations to recommend, (a) an image of the representative item associated with the individual page destination and (b) text identifying the individual page destination; and in response to a user selection, within the selectable navigation pane, of a first image or first text associated with a first page destination of the plurality of page destinations, redirecting the browser or application to a new page, wherein the new page presents a plurality of items associated with one of a search query, a topic, or an item category represented by the first page destination.

2. The system of claim 1, wherein the plurality of page destinations each represent a different search query, wherein the new page presents information identifying a plurality of items resulting from a search of the electronic catalog for a first search query represented by the first page destination.

3. The system of claim 1, wherein the plurality of page destinations each represent a different topic, wherein the new page presents information identifying a plurality of items previously associated in an electronic data store with a first topic represented by the first page destination.

4. The system of claim 1, wherein the plurality of page destinations included in the selectable navigation pane are presented in a ranked order.

5. A computer-implemented method comprising:
sending to a user computing device, for display by a browser or application operating on the user computing device, an initial page that presents item information regarding a first item, wherein the initial page for the first item includes a search field that enables a user to type a search query;
receiving an indication that the user has selected the search field in order to enter text within the search field;
in response to the indication that the user has selected the search field, prior to receiving text entry within the search field:
determining a plurality of page destinations to recommend to the user based on the first item presented on the initial page, wherein the plurality of page destinations are each associated with at least one of a search query or a topic; and
sending data or instructions to the user computing device that, when processed by the browser or application, cause the browser or application to present, over at least a portion of the initial page adjacent to or beneath the search field, selectable options for navigating to a recommended page destination, wherein the selectable options include, for each individual page destination of the plurality of page destinations to recommend, at least one of (a) an image representing the individual page destination or (b) text identifying the individual page destination; and
in response to a user selection of a first image or first text associated with a first page destination of the plurality of page destinations, redirecting the browser or application to a new page, wherein the new page presents a plurality of items associated with one of a search query or topic represented by the first page destination.

6. The computer-implemented method of claim 5, wherein the indication that the user has selected the search field corresponds to a request by the user to place a text insertion cursor within the search field.

7. The computer-implemented method of claim 5, wherein the indication that the user has selected the search field results from one of a touch gesture within the search field or a mouse click while a cursor is within the search field.

8. The computer-implemented method of claim 5, wherein the plurality of items presented on the new page are in a ranked order.

9. The computer-implemented method of claim 5, wherein the plurality of page destinations each represent a different recommended search query related to the first item, wherein the selectable options include a first selectable option comprising text identifying a first recommended search query.

10. The computer-implemented method of claim 5, wherein the plurality of page destinations each represent a different topic related to the first item.

11. The computer-implemented method of claim 5, wherein the new page presents a plurality of groups of items, wherein each group is arranged in a different row presented on the new page.

12. The computer-implemented method of claim 5, wherein determining the plurality of page destinations to recommend to the user is further based on a selection by the user of an item attribute of the first item presented on the initial page, wherein the selection by the user of the item attribute is made prior to the indication that the user has selected the search field.

13. Non-transitory computer readable media including computer-executable instructions that, when executed by a computing system, cause the computing system to perform operations comprising:
sending to a user computing device, for display by a browser or application operating on the user computing device, an initial page that presents item information regarding a first item, wherein the initial page for the first item includes a search field that enables a user to type a search query;
receiving an indication that the user has selected the search field in order to enter text within the search field;
in response to the indication that the user has selected the search field, prior to receiving text entry within the search field:
determining a plurality of search queries related to the first item presented on the initial page, wherein the plurality of search queries are based at least in part on activity of a plurality of users other than the user; and
sending data or instructions to the user computing device that, when processed by the browser or application, cause the browser or application to present, over at least a portion of the initial page, selectable options for navigating to different search result pages, wherein the selectable options include, for each individual search query of the plurality of search queries related to the first item, at least one of (a) an image of a representative item related to the individual search query or (b) text identifying the individual search query.

14. The non-transitory computer readable media of claim 13, wherein the operations further comprise:
in response to a user selection of a first image or first text associated with a first search query of the plurality of search queries, redirecting the browser or application to a new page, wherein the new page presents a plurality of items associated with the first search query without the user typing the first search query.

15. The non-transitory computer readable media of claim 13, wherein the plurality of search queries related to the first item include a prior search query that at least one user other than the user previously entered when viewing at least one page regarding the first item.

16. The non-transitory computer readable media of claim 13, wherein the selectable options are presented in a ranked order.

17. The non-transitory computer readable media of claim 13, wherein the selectable options for navigating to different search result page include, for each individual search query of the plurality of search queries related to the first item, both of (a) the image of the representative item related to the individual search query and (b) text identifying the individual search query.

\* \* \* \* \*